United States Patent
Yang et al.

(10) Patent No.: US 12,010,009 B2
(45) Date of Patent: Jun. 11, 2024

(54) METHOD FOR DISTRIBUTING CONTENT, ELECTRONIC DEVICE, AND COMPUTER PROGRAM PRODUCT

(71) Applicant: EMC IP Holding Company LLC, Hopkinton, MA (US)

(72) Inventors: Wenbin Yang, Shanghai (CN); Jiacheng Ni, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 17/397,048

(22) Filed: Aug. 9, 2021

(65) Prior Publication Data

US 2023/0035840 A1    Feb. 2, 2023

(30) Foreign Application Priority Data

Jul. 23, 2021    (CN) .......................... 202110837711.4

(51) Int. Cl.
*H04L 45/16*    (2022.01)

(52) U.S. Cl.
CPC .................................. *H04L 45/16* (2013.01)

(58) Field of Classification Search
None
See application file for complete search history.

(56) References Cited

U.S. PATENT DOCUMENTS

| 7,650,376 B1 | 1/2010 | Blumenau | |
| 7,751,360 B2 * | 7/2010 | Yagyu | H04L 12/4625 370/408 |

(Continued)

FOREIGN PATENT DOCUMENTS

| CN | 101911687 A | 12/2010 |
| CN | 102326161 A | 1/2012 |

(Continued)

OTHER PUBLICATIONS

Trading storage for bandwidth—a simulation study of optical circuit switching with massive storage at network edge Fengqin Li;Weiqiang Sun;Shengnan Yue;Weisheng Hu 2017 19th International Conference on Transparent Optical Networks (ICTON) Year: 2017 | Conference Paper | Publisher: IEEE (Year: 2017).*

(Continued)

*Primary Examiner* — Jeffrey R Swearingen
(74) *Attorney, Agent, or Firm* — Ryan, Mason & Lewis, LLP

(57) ABSTRACT

Embodiments of the present disclosure relate to a method for distributing content, an electronic device, and a computer program product. The method for distributing content provided in embodiments of the present disclosure includes acquiring neighboring topological information of a plurality of nodes in a collaborative storage network, the plurality of nodes being used for collaboratively storing a plurality of contents requested by a client, the neighboring topological information at least indicating a one-hop relationship between directly connected one-hop node pairs among the plurality of nodes and a two-hop relationship between two-hop node pairs connected via an intermediate node among the plurality of nodes; determining a potential cost of transmitting a plurality of to-be-distributed contents among the plurality of nodes based on the neighboring topological information; and distributing a target content among the plurality of contents to a node among the plurality of nodes based on the potential cost.

20 Claims, 7 Drawing Sheets

(56) References Cited

U.S. PATENT DOCUMENTS

| | | | |
|---|---|---|---|
| 7,970,820 B1 | 6/2011 | Sivasubramanian et al. | |
| 10,813,001 B1* | 10/2020 | Ibarra | H04W 4/06 |
| 10,855,578 B1* | 12/2020 | Mosko | H04L 41/12 |
| 2005/0188108 A1 | 8/2005 | Carter et al. | |
| 2008/0147881 A1* | 6/2008 | Krishnamurthy | H04L 45/02 709/238 |
| 2011/0295983 A1* | 12/2011 | Medved | H04L 45/04 709/224 |
| 2012/0131289 A1* | 5/2012 | Taguchi | G06F 3/0635 709/213 |
| 2012/0179870 A1* | 7/2012 | Wang | H04L 41/12 711/E12.001 |
| 2013/0007187 A1 | 1/2013 | Esteban et al. | |
| 2014/0108609 A1* | 4/2014 | Vu Duong | H04L 67/1097 709/217 |
| 2014/0280454 A1 | 9/2014 | Medard et al. | |
| 2015/0036536 A1* | 2/2015 | Kumar | H04L 45/12 370/254 |
| 2016/0072697 A1* | 3/2016 | Thubert | H04L 45/025 370/254 |
| 2017/0126832 A1* | 5/2017 | Dao | H04L 67/568 |
| 2017/0163540 A1 | 6/2017 | Li et al. | |
| 2019/0116340 A1 | 4/2019 | Segel | |
| 2019/0245775 A1* | 8/2019 | Chen | H04L 45/42 |
| 2019/0327175 A1 | 10/2019 | Ying et al. | |
| 2021/0135974 A1 | 5/2021 | Chen et al. | |
| 2022/0217073 A1* | 7/2022 | Roweth | H04L 43/0876 |

FOREIGN PATENT DOCUMENTS

| | | | | |
|---|---|---|---|---|
| CN | 102904910 | A | 1/2013 | |
| CN | 105229624 | A | 1/2016 | |
| CN | 105847159 | A | 8/2016 | |
| CN | 105871612 | A | 8/2016 | |
| CN | 107005781 | A | 8/2017 | |
| CN | 109922161 | A | 6/2019 | |
| CN | 110391982 | A | 10/2019 | |
| CN | 110868705 | A | 3/2020 | |
| CN | 110933140 | A | 3/2020 | |
| CN | 112202679 | A | 1/2021 | |
| CN | 112787832 | A | 5/2021 | |
| EP | 2852125 | A1 | 3/2015 | |
| WO | WO-2016033582 | A1 * | 3/2016 | H04L 45/125 |
| WO | WO-2018136246 | A1 * | 7/2018 | H04L 1/0057 |
| WO | WO-2019143593 | A1 * | 7/2019 | G06F 21/645 |

OTHER PUBLICATIONS

Improved approaches for cost-effective traffic grooming in WDM ring networks: ILP formulations and single-hop and multihop connections Jian Wang; Wonhong Cho; V. Rao Vemuri; B. Mukherjee Journal of Lightwave Technology Year: 2001 | vol. 19, Issue: 11 | Journal Article | Publisher: IEEE (Year: 2001).*

Service differentiation for collaborative caching query process in mobile database Published in: 2011 Malaysian Conference in Software Engineering (pp. 429-433) Elfaki, M.A. • Ibrahim, H. • Mamat, A. • Othman, M. IEEE Conference Paper (Year: 2011).*

T. X. Tran et al., "Collaborative Mobile Edge Computing in 5G Networks: New Paradigms, Scenarios, and Challenges," arXiv:1612.03184v2, Apr. 11, 2017, 7 pages.

W. L. Hamilton et al., "Inductive Representation Learning on Large Graphs," arXiv:1706.02216v4, Sep. 10, 2018, 19 pages.

T. X. Tran et al., "Octopus: A Cooperative Hierarchical Caching Strategy for Cloud Radio Access Networks," arXiv:1608.00067v2, Oct. 21, 2016, 9 pages.

X. Wang et al., "A Cloud-Edge Computing Framework for Cyber-Physical-Social Services," Journal IEEE Communications Magazine, Nov. 2017, pp. 80-85.

G. Tang et al., "When More May Not Be Better: Toward Cost-Efficient CDN Selection," IEEE Conference on Computer Communications Poster and Demo, Apr. 2018, 2 pages.

Z. Deng et al., "Energy Consumption Optimization Method for Cloud Storage Content Distribution Network," Journal of Computer Applications, vol. 36, No. 6, Jun. 10, 2016, 6 pages.

Y. Liu, "Research on Content Placement Optimization Method in Cloud Content Distribution Network," Master's Degree Thesis in Computer Software and Theory at Shandong Normal University, Jun. 10, 2019, 45 pages.

Search Report in CN202110837711.4, dated Mar. 15, 2024, 5 pages.

* cited by examiner

METHOD FOR DISTRIBUTING CONTENT, ELECTRONIC DEVICE, AND COMPUTER PROGRAM PRODUCT

RELATED APPLICATION(S)

The present application claims priority to Chinese Patent Application No. 202110837711.4, filed Jul. 23, 2021, and entitled "Method for Distributing Content, Electronic Device, and Computer Program Product," which is incorporated by reference herein in its entirety.

FIELD

Embodiments of the present disclosure relate to the field of data storage technologies, and more specifically to, a method for distributing content, an electronic device, and a computer program product.

BACKGROUND

A plurality of nodes in a collaborative storage network can collaboratively store data. Thus, when a client requests a desired content (for example, a video), the requested content may be transmitted to the client from the nearest node, instead of being transmitted to the client from a cloud server every time, thereby reducing the load of the core network, and improving the content delivery performance. A storage policy indicates which contents among a plurality of contents are stored in a node among the plurality of nodes. The quality of the storage policy affects the cost of transmitting content between nodes in the collaborative storage network.

SUMMARY

In a first aspect of the present disclosure, a method for distributing content is provided. The method includes acquiring neighboring topological information of a plurality of nodes in a collaborative storage network, the plurality of nodes being used for collaboratively storing a plurality of contents requested by a client, the neighboring topological information at least indicating a one-hop relationship between directly connected one-hop node pairs among the plurality of nodes and a two-hop relationship between two-hop node pairs connected via an intermediate node among the plurality of nodes. The method further includes determining a potential cost of transmitting a plurality of to-be-distributed contents between the plurality of nodes based on the neighboring topological information. The method further includes distributing a target content among the plurality of contents to a node among the plurality of nodes based on the potential cost.

In a second aspect of the present disclosure, an electronic device is provided. The electronic device includes a processor and a memory coupled to the processor. The memory contains instructions stored therein. The instructions, when executed by the processor, cause the electronic device to execute actions. The actions include acquiring neighboring topological information of a plurality of nodes in a collaborative storage network, the plurality of nodes being used for collaboratively storing a plurality of contents requested by a client, the neighboring topological information at least indicating a one-hop relationship between directly connected one-hop node pairs among the plurality of nodes and a two-hop relationship between two-hop node pairs connected via an intermediate node among the plurality of nodes. The actions further include determining a potential cost of transmitting a plurality of to-be-distributed contents between the plurality of nodes based on the neighboring topological information. The actions further include distributing a target content among the plurality of contents to a node among the plurality of nodes based on the potential cost.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

This Summary is provided to introduce selection of concepts in a simplified form, which will be further described in the Detailed Description below. The Summary is neither intended to identify key features or major features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the figures.

DETAILED DESCRIPTION

The principles of the present disclosure will be described below with reference to some example embodiments shown in the accompanying drawings. While the figures show illustrative embodiments of the present disclosure, it should be understood that these embodiments are described merely to enable those skilled in the art to better understand and then implement the present disclosure, and are not intended to impose any limitation on the scope of the present disclosure.

The term "including" and variations thereof used herein denote open-ended inclusion, i.e., "including, but not limited to." Unless otherwise specifically stated, the term "or" denotes "and/or." The term "based on" denotes "at least partially based on." The terms "an example embodiment" and "an embodiment" denote "at least one example embodiment." The term "another embodiment" denotes "at least one additional embodiment." The terms "first," "second," and the like may refer to different or identical objects. Other explicit and implicit definitions may be further included below.

Figure 1:
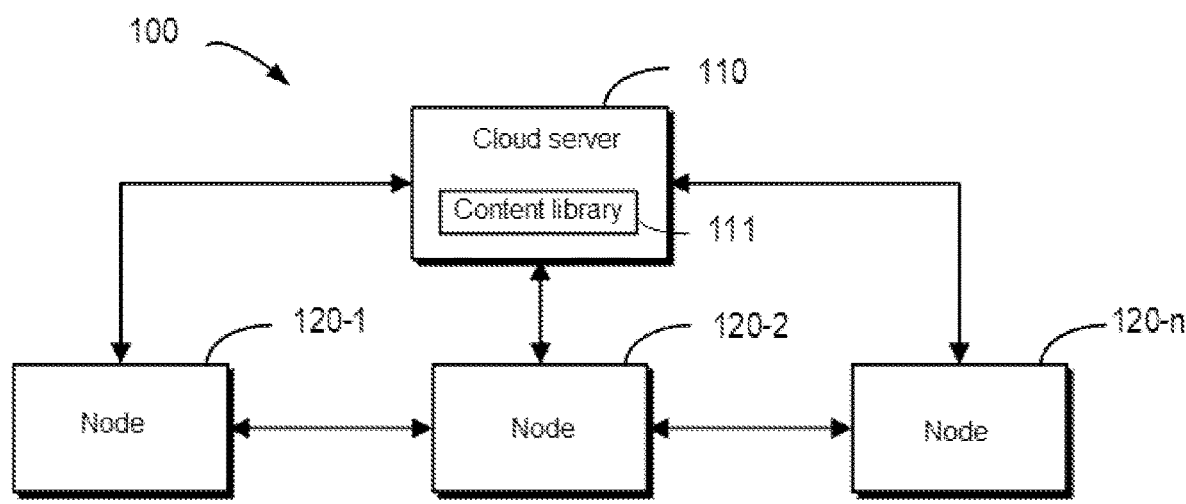
FIG. 1 shows a schematic diagram of an example environment in which an embodiment of the present disclosure may be implemented.

FIG. 1 shows a schematic diagram of an example environment in which an embodiment of the present disclosure may be implemented. As shown in FIG. 1, environment 100 includes cloud server 110, node 120-1, node 120-2, and node 120-*n* (also collectively or individually referred to as "nodes 120"), where n is a natural number. Content library 111 is stored in cloud server 110. Said content library 111 stores one or more contents, and the content may be, for example, a video (such as a movie or an episode of a TV series). Cloud server 110 and each node 120 may communicate with each other. For example, cloud server 110 may distribute to nodes 120 a plurality of contents to be collaboratively stored among nodes 120. Nodes 120 may acquire content in content library 111 from cloud server 110 and store the acquired content.

A plurality of nodes among nodes 120 may communicate with each other. For example, node 120-1 and node 120-2 may transmit a content stored in node 120-1 and node 120-2 to each other. It should be understood that the structure and function of environment 100 are described for example purposes only, and do not imply any limitation to the scope of the present disclosure. For example, the embodiment of the present disclosure may also be applied to an environment other than environment 100. In addition, only three nodes are shown in FIG. 1, but the number of nodes is not limited to three, and there may be more or fewer nodes.

In the case where the plurality of contents has been distributed by cloud server 110 to a plurality of nodes 120, a client (not shown in the figure) sends a request for a specific content to one node (for example, node 120-1) among the plurality of nodes 120. If the specific content exists in node 120-1, node 120-1 transmits the specific content to the client. If the specific content does not exist in node 120-1, node 120-1 pulls the specific content from other nodes in environment 100 or from cloud server 110, and then transmits the specific content to the client.

Limited by its storage capacity, a single node can only store a part of contents among the plurality of contents. In a conventional solution, which contents among the plurality of contents should be stored in a node among the plurality of nodes is optimized based on a storage capacity of each node in a network and a to-be-distributed content, thereby reducing the total cost of transmitting the content in the network.

However, in a known conventional solution, when the optimization is performed as above, it is necessary to consider the cost of transmitting the to-be-distributed content between all node pairs in the network. With the increase of the number of nodes or the increase of the amount of the to-be-distributed content, the computational complexity and computational workload in the optimization process will be increased significantly.

In addition, in the conventional solution, the above optimization result is not interpretable, and the optimization result cannot be used for a downstream task. That is, in the case where the above optimization has been performed, when the client requests a specific content from a current node, and the specific content does not exist in the current node, based on the above optimization result, the current node cannot know preferentially from which nodes in the network to pull the specific content. The current node needs to communicate with other nodes respectively to determine whether the specific content exists in a node communicating therewith. Thus, response time to the client request may have a latency.

An embodiment of the present disclosure presents a solution for distributing content, such that with the increase of the number of nodes or the increase of the amount of the to-be-distributed content, the computational complexity and computational workload in the optimization process will not be increased significantly, and such that the optimized result may be used for a downstream task, thereby reducing the cost of content transmission between nodes and reducing the latency of the client.

According to various embodiments of the present disclosure, neighboring topological information of the plurality of nodes is acquired. The neighboring topological information at least indicates a one-hop relationship between directly connected one-hop node pairs and a two-hop relationship between two-hop node pairs connected via an intermediate node. A potential cost is determined based on the neighboring topological information. The potential cost refers to a potential cost of transmitting a plurality of to-be-distributed contents between a plurality of nodes. The potential cost at least includes a first cost of transmitting complementary contents between one-hop node pairs. A target content is distributed to a node among the plurality of nodes based on the potential cost.

According to the embodiments described herein, the computational complexity and the computational workload may be reduced based on the neighboring topological information between the plurality of nodes, thereby reducing the total cost of transmitting the contents between the plurality of nodes, reducing the response time to the user request, and improving the user experience. In addition, because it is not necessary to consider the cost of content transmission between all node pairs, the presented solution is well adapted to the environment.

The basic principles and some example implementations of the present disclosure are described below with reference to FIG. 2 to FIG. 6. It should be understood that these example embodiments are provided merely to enable those skilled in the art to better understand and then implement embodiments of the present disclosure, and are not intended to impose any limitation to the scope of the present disclosure.

Figure 2:
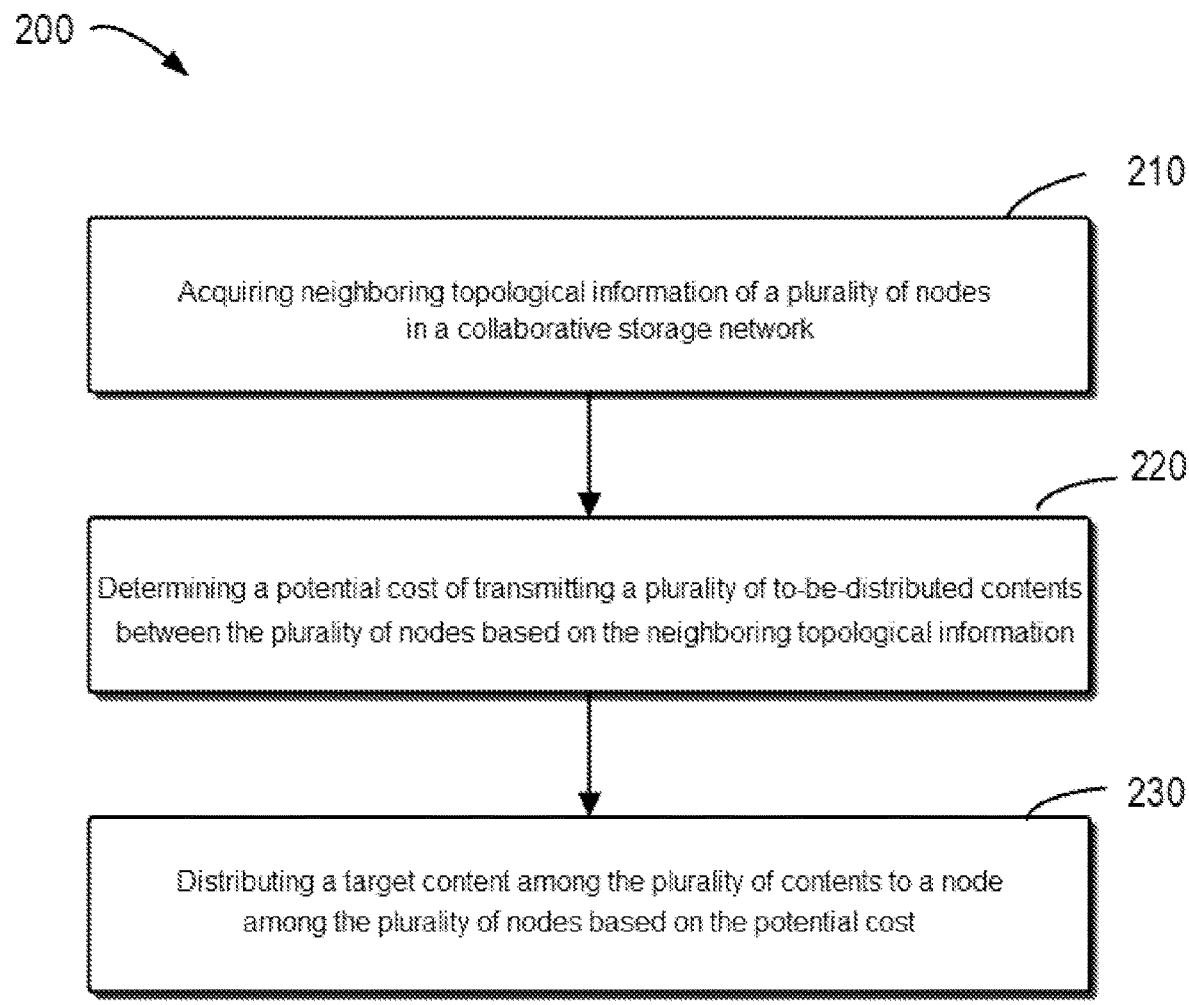
FIG. 2 shows a flow chart of an example method for distributing content according to an embodiment of the present disclosure.

FIG. 2 shows a flow chart of example method 200 for distributing content according to an embodiment of the present disclosure. Method 200 may be implemented by, e.g., cloud server 110 as shown in FIG. 1. It should be understood that method 200 may further include additional actions that are not shown and/or may omit actions that are shown, and the scope of the present disclosure is not limited in this respect. Method 200 will be described in detail below in combination with FIG. 1.

Block 210: acquiring neighboring topological information of a plurality of nodes in a collaborative storage network. The neighboring topological information denotes a neighboring connection relationship between the plurality of nodes. The neighboring topological information at least includes a one-hop relationship between directly connected one-hop node pairs among the plurality of nodes and a two-hop relationship between two-hop node pairs connected via an intermediate node among the plurality of nodes.

Figure 3:
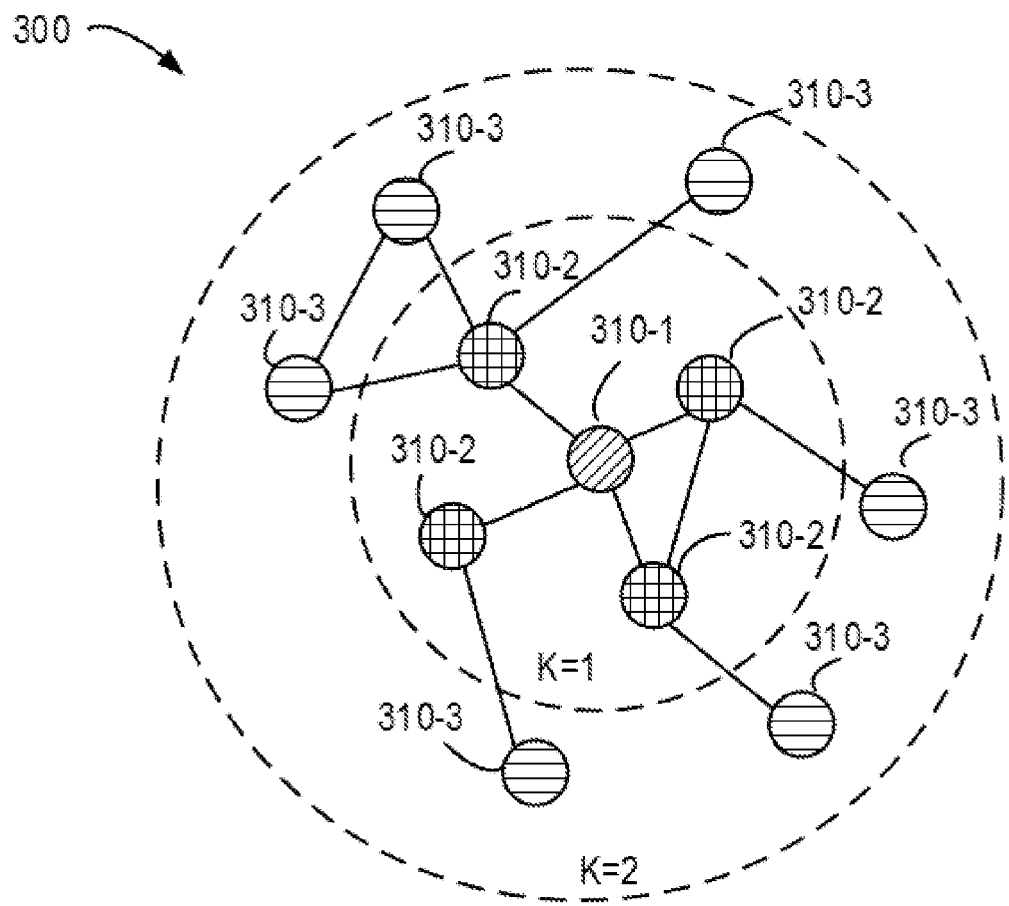
FIG. 3 shows a schematic diagram of a neighboring connection relationship between a plurality of nodes in a collaborative storage network according to some embodiments of the present disclosure.

The neighboring connection relationship between the plurality of nodes will be described in detail below with reference to FIG. 3. FIG. 3 shows a schematic diagram of a neighboring connection relationship between a plurality of nodes in collaborative storage network 300 according to some embodiments of the present disclosure. In FIG. 3, assume that a client (not shown in the figure) sends a request for a specific content to one node (referred to as a "current node") 310-1 among the plurality of nodes. Each node 310-2 directly connected to current node 310-1 is referred to as a one-hop node and is located within dashed circle K=1. A one-hop relationship between current node 310-1 and each one-hop node 310-2 may be expressed by matrix $D_1$ described later. Each node 310-3 connected to current node 310-1 via an intermediate node (for example, one-hop node 310-2) is referred to as a two-hop node, and is located within dashed circle K=2. A two-hop relationship between current node 310-1 and each two-hop node 310-2 may be expressed by matrix $D_2$ described later. For any node in the collaborative storage network, there is no intersection between a one-hop node and a two-hop node thereof. For example, for current node 310-1, its one-hop nodes include a plurality of nodes 310-2 within dashed circle K=1 as shown in the figure. These nodes 310-2 will not appear within dashed circle K=2, i.e., a given node 310-2 that is a one-hop node of current node 310-1 will not be a two-hop node of current node 310-1, and vice versa for the two-hop nodes 310-3.

Further referring to FIG. 2, block 220: determining a potential cost of transmitting a plurality of to-be-distributed contents between the plurality of nodes based on the neighboring topological information. For example, a first cost of transmitting the to-be-distributed contents between directly connected one-hop node pairs among the plurality of nodes is determined. In some embodiments, the first cost may be determined as a cost of transmitting complementary contents between the one-hop node pairs.

In some embodiments, a second cost may be further determined for use as a part of the potential cost, and the second cost is determined as a cost of transmitting partially overlapping contents between two-hop node pairs. For example, assuming that the number of the plurality of to-be-distributed contents is d, potential cost $J(z_n)$ of transmitting a content between an n-th node among the plurality of nodes and neighboring nodes thereof may be expressed as follows:

$$J(z_n) = \sum_{v \in L1(n)} \log(\sigma(z_n^T z_v)) + \sum_{u \in L2(n)} \log(\sigma(-\alpha z_n^T z_u)) \quad (1)$$

where $z_v$ denotes a d-dimensional vector indicating which contents among the plurality of contents are stored in the n-th node; $L1(n)$ denotes a set of neighboring one-hop nodes of the n-th node; $z_u$ denotes a d-dimensional vector indicating which contents among the plurality of contents are stored in one neighboring one-hop node of the n-th node; $L2(n)$ denotes a set of neighboring two-hop nodes of the n-th node; $z_u$ denotes a d-dimensional vector indicating which contents among the plurality of contents are stored in one neighboring two-hop node of the n-th node; $\sigma$ denotes a Sigmoid function; $\alpha$ denotes a weight coefficient, $\alpha > 0$, which may be selected based on experience or set based on experimental effects; $\sum_{v \in L1(n)} \log(\sigma(z_n^T z_v))$ denotes a first cost of transmitting complementary contents between the n-th node and neighboring one-hop nodes thereof; and $\sum_{u \in L2(n)} \log(\sigma(-\alpha z_n^T z_u))$ denotes a second cost of transmitting partially overlapping contents between the n-th node and neighboring two-hop nodes thereof.

It should be understood that the potential cost shown in equation (1) is merely an example, and is not intended to limit the contents of the present disclosure. In the embodiments of the present disclosure, the potential cost may also be expressed in other suitable ways.

In some embodiments, the potential cost may be further determined based on a popularity of each of the contents. The popularity may be expressed by, for example, a click through rate of the content, or other information. This will be described in detail hereinafter in combination with FIG. 4.

Block 230: distributing a target content among the plurality of contents to a node among the plurality of nodes based on the potential cost. In some embodiments, the target content among the plurality of contents is distributed to the node among the plurality of nodes at least by reducing the first cost. In some embodiments, the target content among the plurality of contents is distributed to the node among the plurality of nodes by reducing the first cost and the second cost.

For example, $z_n$ in the above equation (1) may be expressed as follows:

$$z_n = f(W x_n) \quad (2)$$

where vector $x_n$ denotes the n-th node, for example, $x_n$ may be a binary vector indicating coding of the n-th node in the collaborative storage network, and its dimension may be any value; W denotes a learnable network parameter for mapping vector $x_n$ to a d-dimensional vector; and $f(\ )$ denotes an activation function. In this embodiment, a Heaviside step function is used as the activation function, but the activation function is not limited to this particular function, and other common activation functions may also be used. In normal operations, a stretched Sigmoid function is usually used to approximate the Heaviside step function. After vector $x_n$ is mapped using the Heaviside step function as the activation function, resulting d-dimensional vector $z_n$ is a vector merely containing numbers 0 and 1 as vector element values. The number 1 may indicate a content that should be distributed to the n-th node among the d to-be-distributed contents. The number 0 may indicate a content that is not distributed to the n-th node among the d to-be-distributed contents.

Therefore, for the plurality of nodes in the collaborative storage network, there is the following equation:

$$Z = f(WX) \quad (3)$$

where Z denotes a matrix indicating how a plurality of to-be-distributed contents should be distributed to the plurality of nodes in the collaborative storage network; and X denotes a matrix indicating the plurality of nodes in the collaborative storage network. For example, elements of X may be a plurality of d-dimensional vectors.

For simplicity, hereinafter, how a plurality of to-be-distributed contents should be distributed to the plurality of nodes in the collaborative storage network is referred to as a "storage policy."

Potential cost $J(Z)$ as expressed below may be obtained by substituting the above equation (2) into the above equation (1) and using tensor operations.

$$J(Z) = \mathcal{D} \times_1^1 \log(\sigma f(WX)) \times_1^1 \begin{bmatrix} 1 \\ -\alpha \end{bmatrix} \quad (4)$$

where $\mathcal{D}$ denotes a neighboring tensor; $\mathcal{D}[0,:,:] = D_1$ denotes a one-hop relationship between directly connected one-hop node pairs among the plurality of nodes; $\mathcal{D}[1,:,:] = D_2$ denotes a two-hop relationship between two-hop node pairs connected via an intermediate node; $\times_1^1$ denotes an Einstein product for converting a result of multiplying neighboring tensors from a three-dimensional relationship into a two-dimensional result; σ denotes a Sigmoid function; and α denotes a weight coefficient, α>0.

Network parameter W may be learned by reducing the potential cost expressed by the above equation (4), thereby obtaining the storage policy expressed by the above equation (3), i.e., the target content among the plurality of contents may be distributed to the node among the plurality of nodes by reducing the potential cost.

In some embodiments, the target content among the plurality of contents may also be distributed to the node among the plurality of nodes at least by minimizing the first cost. In some embodiments, the target content among the plurality of contents is distributed to the node among the plurality of nodes by minimizing the first cost and the second cost. For example, network parameter W may be learned by minimizing the potential cost expressed by the above equation (4), thereby obtaining the storage policy expressed by the above equation (3).

In some embodiments, the potential cost may be determined not only based on the neighboring topological information, but also based on the popularity of each of the contents. In some additional embodiments, the potential cost may be updated in response to a variation of the popularity of the content, and then the storage policy may be updated based on the updated potential cost.

Figure 4:
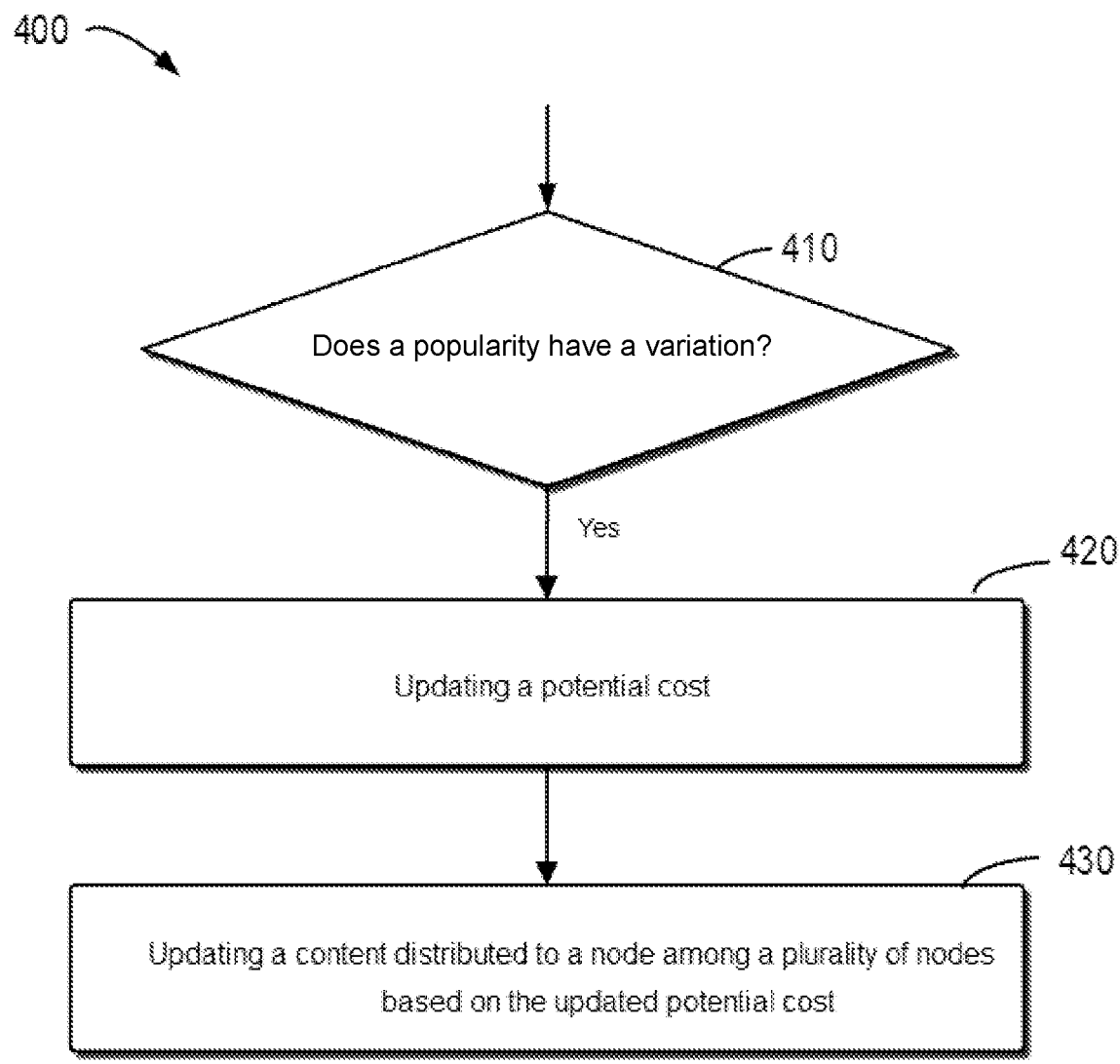
FIG. 4 shows a flow chart of a method for determining a potential cost and updating a storage policy based on a popularity of content according to some embodiments of the present disclosure.

FIG. 4 shows a flow chart of method 400 for determining a potential cost and updating a storage policy based on a popularity of content according to some embodiments of the present disclosure. Method 400 may be regarded as an example implementation of block 220 in method 200. It should be understood that method 400 may further include additional actions that are not shown and/or may omit actions that are shown, and the scope of the present disclosure is not limited in this respect. Method 400 will be described in detail below in combination with FIG. 1.

In this case, potential cost J(Z) may be expressed as follows:

$$J(Z) = \mathcal{D} \times_1^1 \log(\sigma(P \odot \sigma(\lambda W X))) \times_1^1 \begin{bmatrix} 1 \\ -\alpha \end{bmatrix} \quad (5)$$

where $\mathcal{D}$ denotes a neighboring tensor; $\mathcal{D}[0,:,:]=D_1$ denotes a one-hop relationship between directly connected one-hop node pairs among the plurality of nodes; $\mathcal{D}[1,:,:]=D_2$ denotes a two-hop relationship between two-hop node pairs connected via an intermediate node; $\times_1^1$ denotes an Einstein product for converting a result of multiplying neighboring tensors from a three-dimensional relationship into a two-dimensional result; σ denotes a Sigmoid function; α denotes a weight coefficient, α>0; $P=[p_0^T; p_1^T; \ldots p_{N-1}^T]$, $p_n$ denotes a vector indicating a popularity of a content in the n-th node, and $p_n$ may be obtained from statisticizing nodes, such as a click through rate; λ denotes a stretch coefficient of a stretched Sigmoid function; and ⊙ denotes a dot product of a vector.

Block 410: determining whether a popularity has a variation. The popularity may be expressed by, for example, a click through rate of the content or other information.

Block 420: updating a potential cost in response to the variation ("Yes" in block 410) of the popularity of the content. In some embodiments, potential cost J(Z) may be updated in response to the variation of the popularity (i.e., the variation of P) of the content based on the above equation (5). Then, block 430: updating a content distributed to a node among a plurality of nodes based on the updated potential cost. For example, when P in the above equation (5) has the variation, potential cost J(Z) is updated, and the updated storage policy expressed by equation (3) may be obtained by reducing the updated potential cost J(Z). In some embodiments, the updated storage policy expressed by equation (3) may be obtained by minimizing the updated potential cost J(Z).

In some embodiments, the potential cost may be further determined based on a volume of each of the plurality of nodes and a size of each of the plurality of to-be-distributed contents. The size of the content may be, for example, a size of a video (such as a movie or an episode of TV series). Potential cost J(Z) as expressed below may be obtained by substituting the constraints into the above equation (5):

$$J(Z) = \mathcal{D} \times_1^1 \log(\sigma(P \odot \sigma(\lambda W X))) \times_1^1 \begin{bmatrix} 1 \\ -\alpha \end{bmatrix} + \beta \sum_{n=0}^{N-1} (|C_n - q_n \odot Z_n|_1) \quad (6)$$

where β denotes a weight coefficient, which may be selected based on experience or set based on experimental effects; $C_n$ denotes a volume of the n-th node; $q_n$ denotes a size of a content that is to be distributed to the n-th node; $z_n$ denotes a d-dimensional vector indicating which contents among the plurality of contents are stored in the n-th node; and $|\ldots|_1$ denotes an absolute value.

Figure 5:
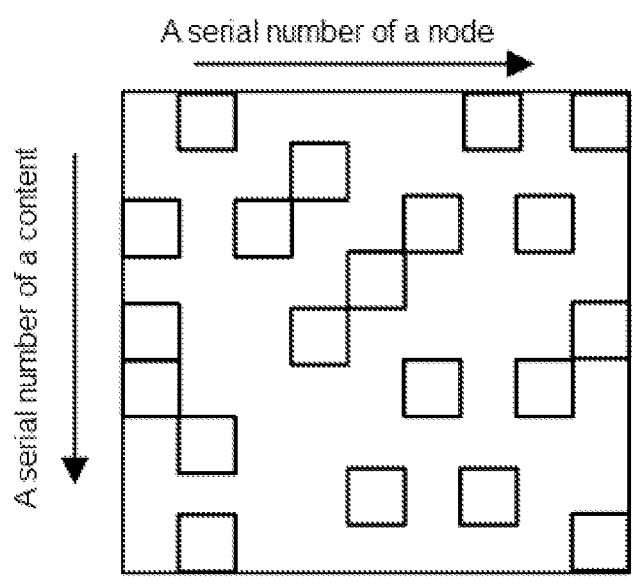
FIG. 5 shows a schematic diagram of a matrix of the storage policy according to some embodiments of the present disclosure.

As mentioned above, the storage policy may be obtained based on the potential cost, i.e., which contents among the plurality of contents are distributed to a node among the plurality of nodes. FIG. 5 shows a schematic diagram of a matrix of the storage policy according to some embodiments of the present disclosure. A matrix row denotes an identifier of a node, for example, a serial number of the node, e.g., the n-th node among the plurality of nodes. A matrix column denotes an identifier of a content, for example, a serial number of the content, e.g., an m-th content among the plurality of contents. A solid block in FIG. 5 denotes a content that should be distributed to a current node.

Figure 6:
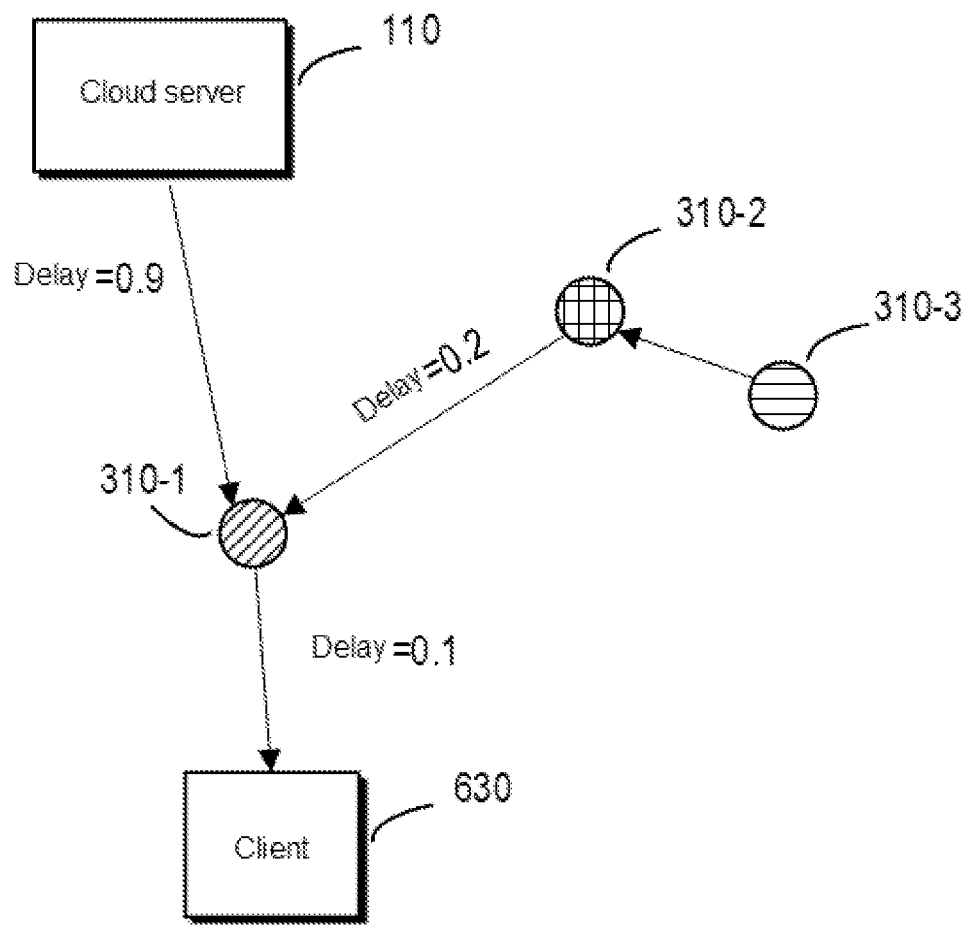
FIG. 6 shows a schematic diagram of a response of the storage policy to a client request according to some embodiments of the present disclosure.

FIG. 6 shows a schematic diagram of a response by using the storage policy shown in FIG. 5 to a request of client 630. FIG. 6 is described in combination with FIG. 3 and FIG. 5. As shown in FIG. 6, client 630 sends a request for a specific content to nearest current node 310-1 as shown in FIG. 3. A response delay from a cloud server to current node 310-1 is 0.9, a response delay from current node 310-1 to client 630 is 0.1, and a response delay from one-hop node 310-2 to current node 310-1 is 0.2. If the specific content is stored in current node 310-1, a response delay to the request is 0.1. If the specific content does not exist in current node 310-1, according to the storage policy shown in FIG. 5, current node 310-1 pulls the specific content from one-hop node 310-2 thereof, and a response delay to the request is 0.3. If the specific content does not exist in current node 310-1 and the specific content does not exist in one-hop node 310-2 or two-hop node 310-3 thereof, current node 310-1 pulls the specific content from cloud server 110, and a response delay to the client request is 1.

Figure 7:
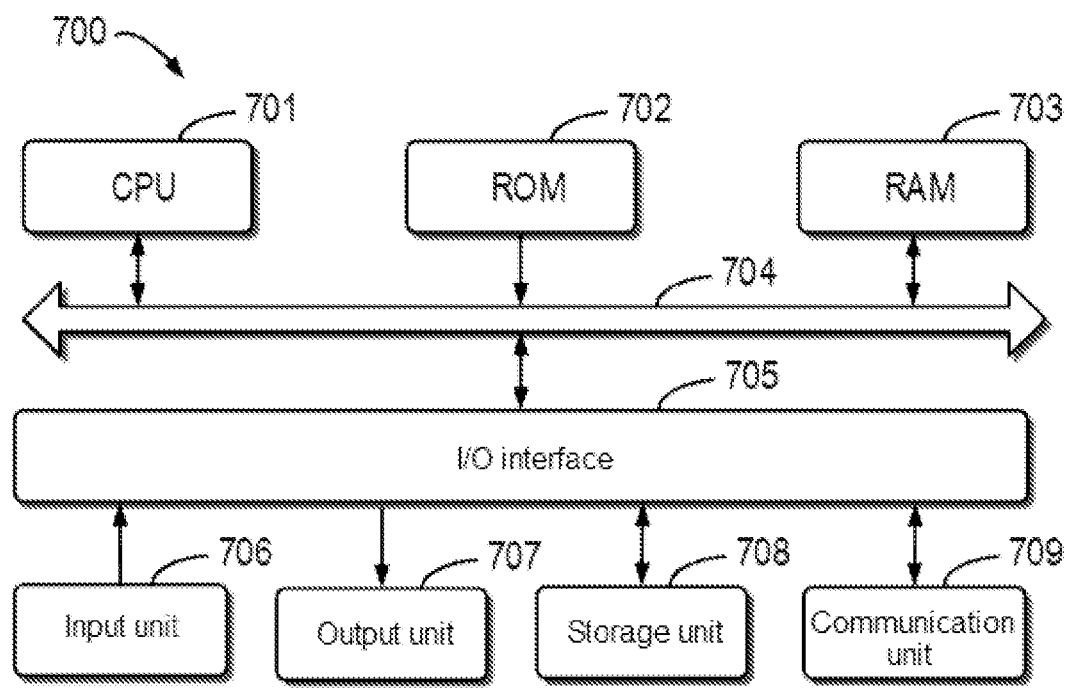
FIG. 7 shows a block diagram of an example device that may be configured to implement embodiments of the present disclosure.

FIG. 7 shows a schematic block diagram of example device 700 that may be configured to implement embodiments of contents of the present disclosure. For example, cloud server 110 as shown in FIG. 1 may be implemented by device 700. As shown in FIG. 7, device 700 includes central processing unit (CPU) 701, which may execute various appropriate actions and processes in accordance with computer program instructions stored in read-only memory (ROM) 702 or computer program indications loaded into random-access memory (RAM) 703 from storage unit 708. RAM 703 may further store various programs and data required by operations of device 700. CPU 701, ROM 702, and RAM 703 are connected to each other through bus 704. Input/output (I/O) interface 705 is also connected to bus 704.

A number of components in device 700 are connected to I/O interface 705, including: input unit 706, such as a keyboard or a mouse; output unit 707, such as various types of displays or speakers; storage unit 708, such as a magnetic disk or an optical disk; and communication unit 709, such as a network card, a modem, or a wireless communication transceiver. Communication unit 709 allows device 700 to exchange information/data with other devices via a computer network, e.g., the Internet, and/or various telecommunication networks.

The processes described above, such as method 200, may be executed by CPU 701. For example, in some embodiments, method 200 may be implemented as a computer software program that is tangibly included in a machine-readable medium, such as storage unit 708. In some embodiments, a part or all of the computer program may be loaded and/or installed onto device 700 via ROM 702 and/or communication unit 709. When the computer program is loaded into RAM 703 and executed by CPU 701, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the above. The computer-readable storage medium used herein is not interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operations of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In the case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

The computer-readable program instructions may be provided to a processing unit of a general-purpose computer, a special-purpose computer, or other programmable data processing apparatuses to produce a machine, such that the instructions, when executed by the processing unit of the computer or other programmable data processing apparatuses, generate an apparatus implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions implementing various aspects of the functions/actions specified in one or more blocks in the flow charts and/or block diagrams.

The computer-readable program instructions may also be loaded to a computer, other programmable data processing apparatuses, or other devices, so that a series of operating steps may be performed on the computer, the other programmable data processing apparatuses, or the other devices to produce a computer-implemented process, such that the instructions executed on the computer, the other programmable data processing apparatuses, or the other devices implement the functions/actions specified in one or more blocks in the flow charts and/or block diagrams.

The flow charts and block diagrams in the figures illustrate the architectures, functions, and operations of possible implementations of the systems, methods, and computer program products according to various embodiments of the present disclosure. In this regard, each block in the flow charts or block diagrams may represent a module, a program segment, or portion of an instruction, the module, the program segment, or the portion of the instruction including one or more executable instructions for implementing specified logical functions. In some alternative implementations, functions annotated in the blocks may also occur in a sequence different from that annotated in the figures. For example, two successive blocks may actually be executed substantially in parallel, and sometimes they may also be executed in an inverse sequence, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for distributing content, comprising:
    acquiring neighboring topological information of a plurality of nodes in a collaborative storage network, the plurality of nodes being used for collaboratively storing a plurality of contents requested by a client, the neighboring topological information comprising at least a first data structure indicating a one-hop relationship between directly connected one-hop node pairs among the plurality of nodes and a second data structure, different than the first data structure, the second data structure indicating a two-hop relationship between two-hop node pairs connected via an intermediate node among the plurality of nodes;
    determining a potential cost of transmitting a plurality of to-be-distributed contents between the plurality of nodes based on one or more tensor operations implemented utilizing the first and second data structures of the neighboring topological information, the tensor operations being based on a tensor of at least three dimensions, with a first one of the dimensions of the tensor taking on a first value to identify additional dimensions corresponding to the first data structure, and taking on a second value to identify additional dimensions corresponding to the second data structure; and
    distributing a target content among the plurality of contents to a node among the plurality of nodes based on the potential cost;
    wherein determining the potential cost of transmitting the plurality of to-be-distributed contents between the plurality of nodes based on the neighboring topological information comprises:
    applying a first cost determination function to at least a subset of the one-hop node pairs, the first cost determination function being based at least in part on which contents among the plurality of contents are stored in at least one one-hop neighboring node of a given node;
    applying a second cost determination function to at least a subset of the two-hop node pairs, the second cost determination function being different than the first cost determination function, the second cost determination function being based at least in part on which contents among the plurality of contents are stored in at least one two-hop neighboring node of the given node; and
    determining the potential cost based on results of the applying of the first cost determination function and the applying of the second cost determination function.

2. The method according to claim 1, wherein determining the potential cost comprises:
    determining a first cost of transmitting complementary contents between the one-hop node pairs for use as at least a part of the potential cost.

3. The method according to claim 2, wherein determining the potential cost further comprises:
    determining a second cost of transmitting partially overlapping contents between the two-hop node pairs for use as a part of the potential cost.

4. The method according to claim 1, wherein distributing the target content to the node among the plurality of nodes comprises:
    minimizing the potential cost to determine the target content to be distributed to the node among the plurality of nodes from among the plurality of contents; and
    distributing the target content to the node.

5. The method according to claim 1, wherein determining the potential cost further comprises:
    further determining the potential cost based on a popularity of each of the plurality of contents.

6. The method according to claim 5, wherein the method further comprises:
    updating the potential cost in response to a variation of the popularity; and
    updating the content distributed to the node among the plurality of nodes based on the updated potential cost.

7. The method according to claim 1, wherein determining the potential cost further comprises:
    further determining the potential cost based on a volume of each of the plurality of nodes and a size of each of the plurality of contents.

8. An electronic device, comprising:
    a processor; and
    a memory coupled to the processor, the memory containing instructions stored therein, the instructions, when executed by the processor, causing the electronic device to execute actions, the actions comprising:
    acquiring neighboring topological information of a plurality of nodes in a collaborative storage network, the plurality of nodes being used for collaboratively storing a plurality of contents requested by a client, the neighboring topological information comprising at least a first data structure indicating a one-hop relationship between directly connected one-hop node pairs among the plurality of nodes and a second data structure, different than the first data structure, the second data structure indicating a two-hop relationship between two-hop node pairs connected via an intermediate node among the plurality of nodes;

determining a potential cost of transmitting a plurality of to-be-distributed contents among the plurality of nodes based on one or more tensor operations implemented utilizing the first and second data structures of the neighboring topological information, the tensor operations being based on a tensor of at least three dimensions, with a first one of the dimensions of the tensor taking on a first value to identify additional dimensions corresponding to the first data structure, and taking on a second value to identify additional dimensions corresponding to the second data structure; and distributing a target content among the plurality of contents to a node among the plurality of nodes based on the potential cost;

wherein determining the potential cost of transmitting the plurality of to-be-distributed contents between the plurality of nodes based on the neighboring topological information comprises:

applying a first cost determination function to at least a subset of the one-hop node pairs, the first cost determination function being based at least in part on which contents among the plurality of contents are stored in at least one one-hop neighboring node of a given node;

applying a second cost determination function to at least a subset of the two-hop node pairs, the second cost determination function being different than the first cost determination function, the second cost determination function being based at least in part on which contents among the plurality of contents are stored in at least one two-hop neighboring node of the given node; and determining the potential cost based on results of the applying of the first cost determination function and the applying of the second cost determination function.

9. The electronic device according to claim 8, wherein determining the potential cost comprises:

determining a first cost of transmitting complementary contents between the one-hop node pairs for use as at least a part of the potential cost.

10. The electronic device according to claim 9, wherein determining the potential cost further comprises:

determining a second cost of transmitting partially overlapping contents between the two-hop node pairs for use as a part of the potential cost.

11. The electronic device according to claim 8, wherein distributing the target content to the node among the plurality of nodes comprises:

minimizing the potential cost to determine the target content to be distributed to the node among the plurality of nodes from among the plurality of contents; and distributing the target content to the node.

12. The electronic device according to claim 8, wherein determining the potential cost further comprises:

further determining the potential cost based on a popularity of each of the plurality of contents.

13. The electronic device according to claim 12, wherein the actions further comprise:

updating the potential cost in response to a variation of the popularity; and updating the content distributed to the node among the plurality of nodes based on the updated potential cost.

14. The electronic device according to claim 8, wherein determining the potential cost further comprises:

further determining the potential cost based on a volume of each of the plurality of nodes and a size of each of the plurality of contents.

15. A computer program product, the computer program product being tangibly stored on a computer-readable medium and comprising machine-executable instructions, the machine-executable instructions, when executed, causing a machine to execute a method for distributing content, the method comprising:

acquiring neighboring topological information of a plurality of nodes in a collaborative storage network, the plurality of nodes being used for collaboratively storing a plurality of contents requested by a client, the neighboring topological information comprising at least a first data structure indicating a one-hop relationship between directly connected one-hop node pairs among the plurality of nodes and a second data structure, different than the first data structure, the second data structure indicating a two-hop relationship between two-hop node pairs connected via an intermediate node among the plurality of nodes;

determining a potential cost of transmitting a plurality of to-be-distributed contents between the plurality of nodes based on one or more tensor operations implemented utilizing the first and second data structures of the neighboring topological information, the tensor operations being based on a tensor of at least three dimensions, with a first one of the dimensions of the tensor taking on a first value to identify additional dimensions corresponding to the first data structure, and taking on a second value to identify additional dimensions corresponding to the second data structure; and distributing a target content among the plurality of contents to a node among the plurality of nodes based on the potential cost;

wherein determining the potential cost of transmitting the plurality of to-be-distributed contents between the plurality of nodes based on the neighboring topological information comprises:

applying a first cost determination function to at least a subset of the one-hop node pairs, the first cost determination function being based at least in part on which contents among the plurality of contents are stored in at least one one-hop neighboring node of a given node;

applying a second cost determination function to at least a subset of the two-hop node pairs, the second cost determination function being different than the first cost determination function, the second cost determination function being based at least in part on which contents among the plurality of contents are stored in at least one two-hop neighboring node of the given node; and determining the potential cost based on results of the applying of the first cost determination function and the applying of the second cost determination function.

16. The computer program product according to claim 15, wherein determining the potential cost comprises:

determining a first cost of transmitting complementary contents between the one-hop node pairs for use as at least a part of the potential cost.

17. The computer program product according to claim 16, wherein determining the potential cost further comprises:

determining a second cost of transmitting partially overlapping contents between the two-hop node pairs for use as a part of the potential cost.

18. The computer program product according to claim 15, wherein distributing the target content to the node among the plurality of nodes comprises:

minimizing the potential cost to determine the target content to be distributed to the node among the plurality of nodes from among the plurality of contents; and distributing the target content to the node.

19. The computer program product according to claim 15, wherein determining the potential cost further comprises:

further determining the potential cost based on a popularity of each of the plurality of contents.

20. The computer program product according to claim 19, wherein the method further comprises:

updating the potential cost in response to a variation of the popularity; and updating the content distributed to the node among the plurality of nodes based on the updated potential cost.

* * * * *